000
(12) United States Patent
Okano et al.

(10) Patent No.: US 7,637,571 B2
(45) Date of Patent: Dec. 29, 2009

(54) VEHICLE SEAT ASSEMBLY

(75) Inventors: Ritsuro Okano, Yokohama (JP);
Shinsuke Hagiwara, Yokohama (JP);
Jun Aoki, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 18 days.

(21) Appl. No.: 12/009,256

(22) Filed: Jan. 16, 2008

(65) Prior Publication Data

US 2008/0211283 A1 Sep. 4, 2008

(30) Foreign Application Priority Data

Jan. 18, 2007 (JP) ............................. 2007-008955

(51) Int. Cl.
*B60N 2/12* (2006.01)
*B60N 2/02* (2006.01)
*B60N 2/00* (2006.01)

(52) U.S. Cl. ........................... 297/343; 297/341; 297/14

(58) Field of Classification Search .................... 297/14, 297/330, 341, 343, 362.11
See application file for complete search history.

(56) References Cited

U.S. PATENT DOCUMENTS

| 1,756,807 | A | * | 4/1930 | Black et al. ............... 297/343 X |
| 2,182,598 | A | * | 12/1939 | Owler .......................... 297/343 |
| 2,229,608 | A | * | 1/1941 | Ragsdale et al. ......... 297/317 X |
| 2,634,796 | A | * | 4/1953 | Fischer ........................ 297/343 |
| 2,712,346 | A | * | 7/1955 | Sprinkle ................. 297/344.12 |
| 2,725,921 | A | * | 12/1955 | Markin .................... 297/216.15 |
| 2,859,797 | A | * | 11/1958 | Mitchelson ............. 297/342 X |
| 3,567,280 | A | * | 3/1971 | Bradshaw ............... 297/343 X |
| 3,632,165 | A | * | 1/1972 | Miller ....................... 297/343 X |
| 4,362,336 | A | * | 12/1982 | Zapf et al. ............... 297/343 X |
| 4,452,486 | A | * | 6/1984 | Zapf et al. .................. 297/343 |
| 5,112,109 | A | | 5/1992 | Takada et al. |
| 5,244,252 | A | * | 9/1993 | Serber ..................... 297/325 X |
| 5,516,195 | A | * | 5/1996 | Canteleux ............... 297/362 X |
| 5,558,399 | A | * | 9/1996 | Serber ..................... 297/343 X |
| 5,735,574 | A | * | 4/1998 | Serber ..................... 297/343 X |
| 6,474,737 | B1 | * | 11/2002 | Canteleux et al. ........ 297/325 X |
| 6,641,214 | B2 | * | 11/2003 | Veneruso ................ 297/343 X |

(Continued)

FOREIGN PATENT DOCUMENTS

DE    38 22 877 A1    1/1990

(Continued)

*Primary Examiner*—Rodney B White
(74) *Attorney, Agent, or Firm*—Foley & Lardner LLP

(57) ABSTRACT

Disclosed is a vehicle seat assembly having a feature in a seat cushion angle adjustment mechanism of a seat cushion in a simple configuration. A vehicle seat assembly according to an embodiment of the present invention comprises a seat back, a seat cushion coupled to the seat back, and a seat cushion angle adjustment mechanism for adjusting the seat angle of the seat cushion. The seat cushion angle adjustment mechanism comprises a seat cushion frame, a pivotal coupling member to pivotably couple the seat cushion frame to a slider of the seat rail, a guided part provided at a position away from a coupled position of the seat cushion frame to the pivotal coupling member, and a guide member having a guide groove which engages the guided part and guides the movement of the guided part and disposed with an angle between the guide groove and the slide surface of the seat rail set to a specific angle α.

6 Claims, 9 Drawing Sheets

U.S. PATENT DOCUMENTS

| | | | |
|---|---|---|---|
| 6,695,378 B2 * | 2/2004 | Hanagan | 297/383 X |
| 7,108,326 B2 * | 9/2006 | Schurg | 297/343 X |
| 7,229,118 B2 * | 6/2007 | Saberan et al. | 297/341 X |
| 7,270,371 B2 * | 9/2007 | Adragna et al. | 297/14 |
| 7,374,245 B2 * | 5/2008 | Tanaka et al. | 297/343 |

FOREIGN PATENT DOCUMENTS

| | | |
|---|---|---|
| DE | 102 25 736 A1 | 1/2004 |
| EP | 1 048 510 A2 | 11/2000 |
| JP | 2-089947 U | 7/1990 |
| JP | 2002345589 A * | 12/2002 |

* cited by examiner

VEHICLE SEAT ASSEMBLY

This application claims priority from Japanese Patent Application No. 2007-008955 filed Jan. 18, 2007, which is incorporated herein by reference in its entirety.

BACKGROUND OF THE INVENTION

1. Field of the Invention

The present invention relates to a vehicle seat assembly and more particularly to a vehicle seat assembly in which a seat cushion angle of a seat cushion is adjustable.

2. Description of the Related Art

Seat assemblies with reclining mechanisms to be used for automotive rear seats or the like have been known in the art. Such a seat assembly comprises a seat cushion having a seat surface on which an occupant sits and a seat back for supporting the occupant's back. In a typical seat assembly with a reclining mechanism, the seat cushion slides forward by the occupant's operation and the seat back interconnected to the seat cushion is drawn and moved by the seat cushion to define a reclining angle (for example, refer to Japanese Unexamined Utility-Model Application Publication No. 2-89947, hereinafter referred to as a Related Art Reference).

The seat assembly disclosed in the above Related Art Reference comprises a seat cushion whose position can be adjusted in the forward and backward directions of the vehicle body and a seat back having an upper seat back and a lower seat back. The lower seat back is pivotably interconnected to the rear end of the seat cushion at the lower end thereof and its rear top end is disposed slidably in the up-down direction of the vehicle body. The upper seat back is pivotably interconnected to the lower seat back at the lower end thereof and is disposed slidably in the up-down direction of the vehicle body. According to the seat assembly of the Related Art Reference, the seat cushion is drawn forward so that the interconnected lower seat back and upper seat back move together to define the reclining angle of the seat back.

If the seat cushion slides forward in parallel as in the seat assembly in the Related Art Reference, a phenomenon so-called hip-sliding that the occupant's hip slides forward as his or her upper body leans backward is provoked so that the seat assembly may not be able to provide an appropriate comfortable position.

To prevent such a hip-sliding, some types of seat assemblies have been proposed: one of them employs a curved seat rail and slides the seat cushion along the curved seat rail to raise the front end of the seat surface and change the seat cushion angle; and another one employs a different device to raise the front end of the seat cushion to change the angle of the seat cushion.

The above-described seat assemblies which prevent the hip-sliding as the seat cushions slide forward are advantageous because the occupants can keep their comfortable relaxing positions. However, special shaped parts such as the curved seat rail are required so that the manufacturing cost increases. In case that an individual device is used, increase of the number of components will cause increase in the weight in addition to increase of the manufacturing cost as a matter of course. The increase in the weight may cause an undesired influence to the fuel consumption for the vehicle with the seat assembly mounted thereon. Moreover, the space in the vehicle is limited so that a configuration is required to be fitted in a smallest space as possible.

SUMMARY OF THE INVENTION

A vehicle seat assembly according to an aspect of the present invention comprises a seat back, a seat cushion coupled to the seat back, and a seat cushion angle adjustment mechanism for adjusting a seat cushion angle of the seat cushion. The seat cushion angle adjustment mechanism comprises a seat cushion frame, a pivotal coupling member for pivotably coupling the seat cushion frame to a slider of a seat rail, a guided member coupled to the seat cushion frame and movement of the guided member being guided at a position away from a coupled position of the pivotal coupling member and the slider, and a guide member for guiding movement of the guided member in a specific angular direction crossing with a sliding direction of the slider so as to change a seat cushion angle with sliding of the seat cushion. The seat cushion angle adjustment mechanism achieves adjustment of the angle of the seat cushion to effectively prevent the hip-sliding in a simple configuration.

Preferably, the guide member engages the guided member and has a long hole for guiding movement of the guided member, which achieves adjustment of the seat cushion angle with only simple components. Moreover, it is preferable that the slider slides substantially linearly on along the seat rail, and the guide member guides the guided member to move linearly toward the specific angular direction. This improves general versatility of the seat cushion angle adjustment mechanism.

Preferably, the guide member is formed integrally with a bracket to fix the seat rail to a vehicle body. This reduces the assembling man-hours and improves assembling accuracy as well.

Preferably, the seat back comprises an upper frame and a lower frame bendably coupled to the upper frame; the upper frame has a slide mechanism for sliding in the up-down direction of the seat; and the lower frame is pivotably coupled to a seat back side end of the seat cushion frame. According to this configuration, the seat cushion angle changes, the lower seat back moves forward, and the upper seat back moves downward in parallel as the seat cushion slides. This achieves a comfortable position for the occupant by a reclining angle preventing the hip-sliding and a folding angle for supporting the upper body of the occupant.

Preferably, couplers of a pair of the pivotal coupling members to the seat cushion frame are disposed to point to either one of the right and left directions of the seat on the right and left seat rails; and a pair of the guide members are disposed on the same side of either one of the right and left directions of the seat on the right and left seat rails. This is to improve work efficiency because the seat cushion angle adjustment mechanism can be assembled from one side.

The present invention achieves a seat cushion angle adjustment mechanism in a simple configuration which provides a comfortable relaxing position for an occupant, preventing the hip-sliding.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
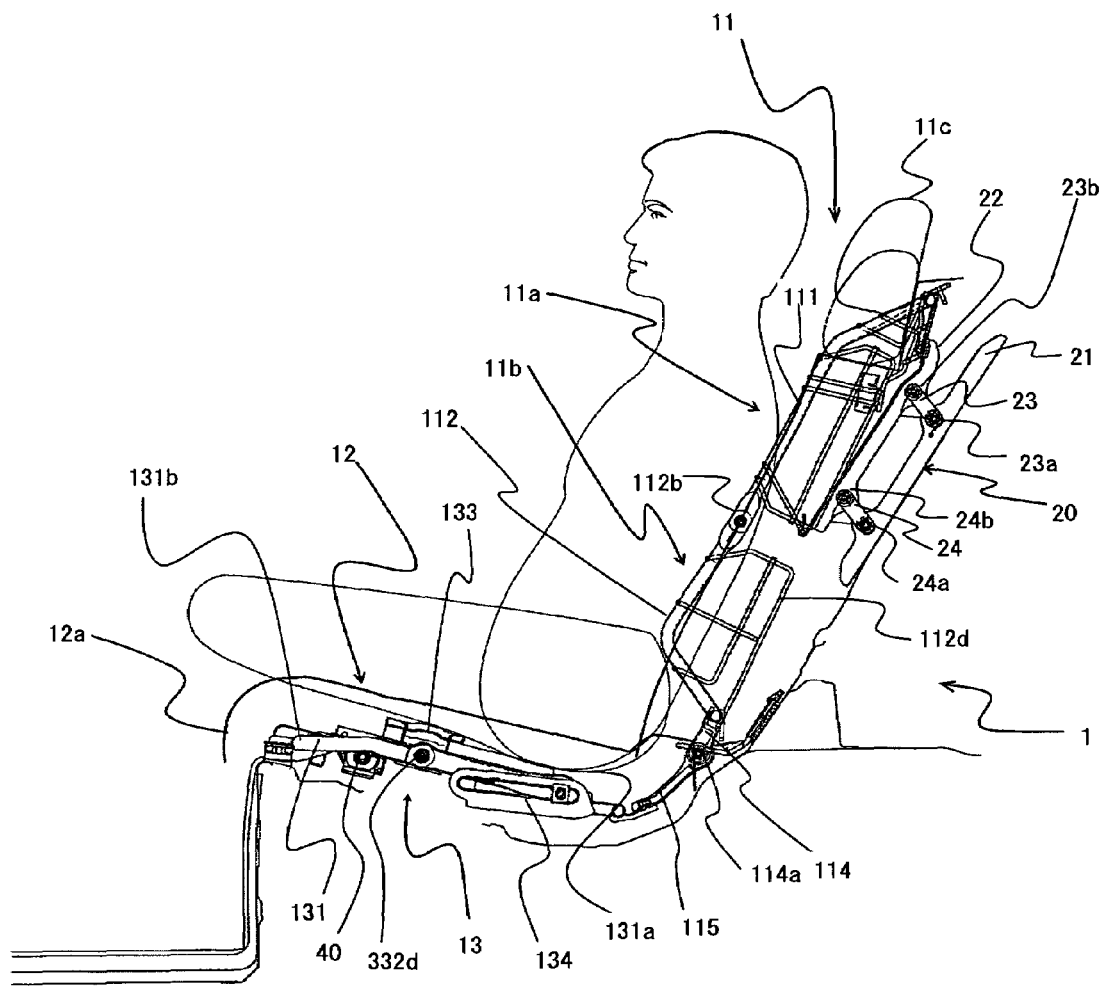
FIG. 1 is a drawing schematically illustrating a partial configuration of the vehicle seat assembly in a normal mode according to an embodiment of the present invention.

Hereinafter, a preferred embodiment to which the present invention is applicable will be described. For clearness of explanation, the following description and the accompanying drawings contain omissions and simplifications as appropriate. Throughout the drawings, the like components are denoted by like reference numerals, and their repetitive description is omitted if not necessary.

FIG. 1 schematically illustrates a partial configuration of a vehicle seat assembly 1 according to the present embodiment. The vehicle seat assembly 1 comprises a seat back 11 which is a back rest for an occupant to lean his or her back against it in his or her sitting position and a seat cushion 12 having a seat surface on which the occupant sits. The vehicle seat assembly 1 according to the present embodiment further comprises a seat cushion angle adjustment mechanism 13 for adjusting the seat cushion angle of the seat cushion 12 in accordance with the reclining movement of the seat. The vehicle seat assembly 1 exemplified in FIG. 1 is used for automotive rear seats or automotive seats in a single row only.

In the present specification, the direction of the seat cushion 12 side of the seat back 11 is defined to be the front and the opposite side is defined to be the rear. Also, the direction of the seat cushion 12 side of the seat back 11 is defined to be the downside and the opposite head rest side is defined to be the upside. These directions correspond to the front, rear, downside, and upside of the occupant in the sitting position. The left and right directions of the occupant in the sitting position are defined to be the left and right directions of the seat.

FIG. 1 shows a part of the components of the seat back 11 and the seat cushion 12. First, the seat back 11 comprises an upper seat back 11a, the lower seat back 11b, and a head rest 11c. Inside of the seat back 11, an upper frame 111 as a framework for supporting the upper seat back 11a and a lower frame 112 as a framework for supporting the lower seat back 11b are provided. The head rest 11c is a component against which the occupant leans the back of his or her head and is disposed slidably in the up-down direction at the upper part of the seat back 11 and its positional adjustment can be made suitably. The seat back 11 further comprises a seat back pad provided around the upper frame 111 and the lower frame 112, a surface cover material for covering the surface of the seat back pad, and the like.

Figure 3:
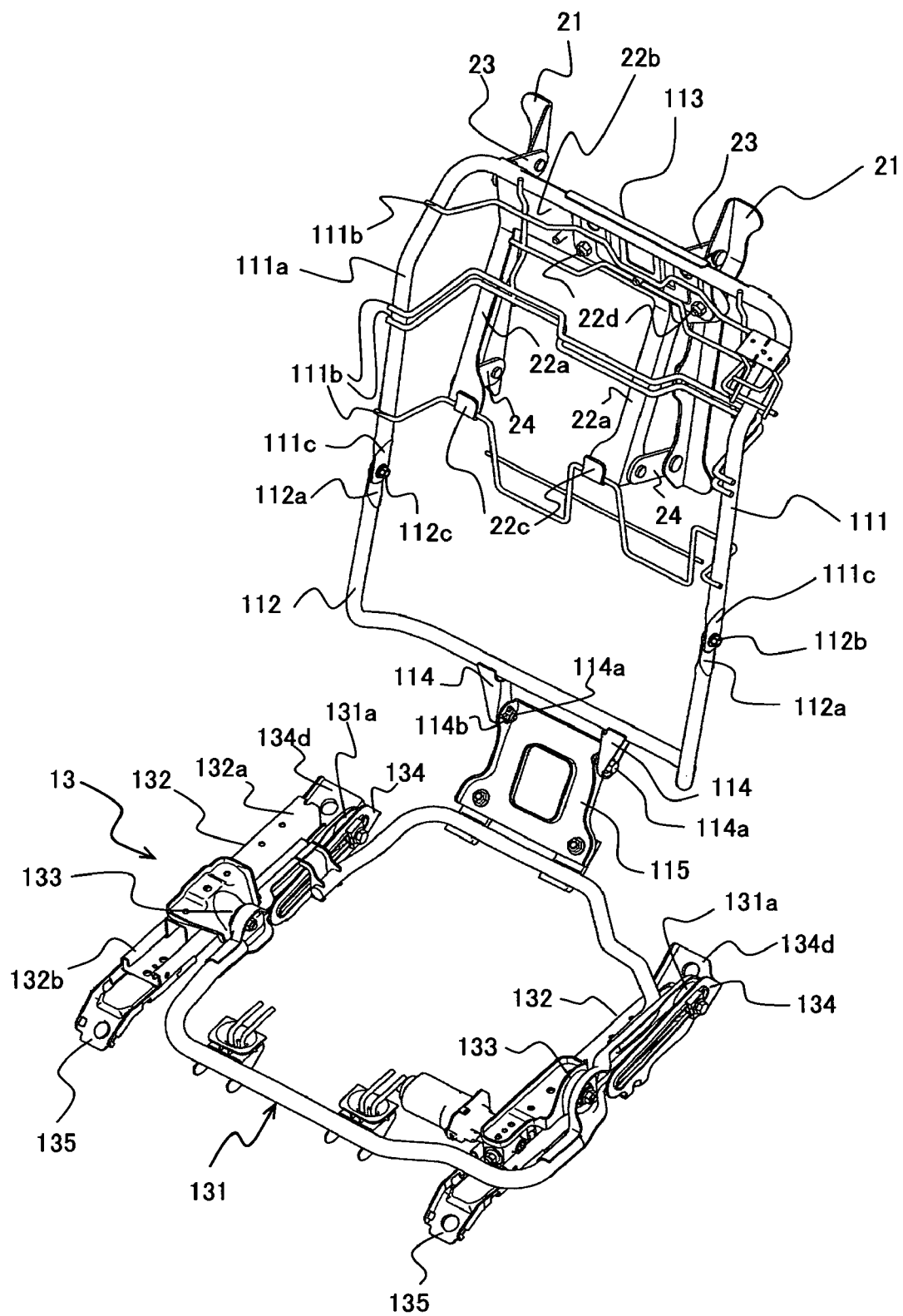
FIG. 3 is a perspective view showing the outline of a frame structure of the vehicle seat assembly according to an embodiment of the present invention.

FIG. 3 is a perspective view showing the outline of frame structures of the seat back and the seat cushion. As shown in FIG. 3, the upper frame 111 comprises a main frame 111a having three ribs and substantially U-shaped in a planar view, a plurality of auxiliary frames 111b for reinforcing and fixing the main frame 111a, and a joint bracket 113 joined to the top end of the main frame 111a.

The upper frame 111 is secured to the vehicle body via a parallel link mechanism 20 functioning as a slide mechanism.

As illustrated in FIG. 1, the parallel link mechanism 20 comprises a base 21 to be fixed to the vehicle body with bolts (not shown) and a link bracket 22 facing the base 21. To the base 21, one end of the upper link 23 and one end of the lower link 24 are pivotably secured with a pivotal shaft 23a and a pivotal shaft 24a, respectively in order from the upper side. The other ends of the links 23 and 24 are pivotably secured to the link bracket 22 with pivotal shafts 23b and 24b, respectively. In this way, the so-called parallel link mechanism is formed by disposing the centers of the pivotal shafts 23a, 24a, 23b, and 24a to be apexes of a substantial parallelogram. The parallel link mechanism 20 realizes a configuration that the link bracket 22 can slide keeping nearly parallel with the base 21.

As shown in FIG. 3, the bases 21 at the right and the left are a pair and form the parallel link mechanisms in the same shape at the right and the left respectively. The link bracket 22 is a component substantially U-shaped in a planar view including link attachments 22a which faces the left and right bases 21 and the upper link 23 and the lower link 24 are attached thereto, and a coupler 22b to couple the upper ends of the right and left link attachments 22a.

At the lower end of the link attachment 22a, a turnover 22c is provided and a part of the auxiliary frames 111b for the upper frame 111 is engaged therein. Then, the coupler 22b and the coupling bracket 113 of the upper frame 111 are fastened with bolts 22d. In this way, the base 21 of the parallel link mechanism 20 is fastened to the vehicle body with bolts (not shown) and the upper frame 111 is fixed to the link bracket 22 so that the upper frame 111 is slidably secured to the vehicle body via the parallel link mechanism 20.

The lower frame 112 is a frame having three ribs and substantially U-shaped in a planar view as shown in FIG. 3. The upper ends 112a of the lower frame 112 are bendably connected to the lower ends 111c of the upper frame 111 with stepped bolts 112b and nuts 112c. This forms a frame substantially rectangular-shaped in a planar view inside the seat back 11. At the middle of the lower end of the lower frame 112, a pair of hinge brackets 114 is formed. To the hinge brackets 114, a coupling plate 115 is pivotably secured with stepped bolts 114a and nuts 114b. The coupling plate 115 is coupled to the seat cushion which will be described later. For the lower frame, an auxiliary frame 112d for reinforcement is provided, too, as shown in FIG. 1.

The seat cushion 12 includes a seat cushion angle adjustment mechanism 13 inside thereof. In addition to the mechanism, it comprises a cushion pad provided around the seat cushion angle adjustment mechanism 13 and a surface cover material for covering the surface of the cushion pad, and the like.

As shown in FIG. 3, the seat cushion angle adjustment mechanism 13 comprises a seat cushion frame 131 substantially rectangular-shaped in a planar view, a pivotal coupling member 133 for pivotably coupling a middle part of the seat cushion frame 131 in the front-rear direction to an upper rail 132a of a seat rail 132, a guided part 131a provided at the side of the rear end of the seat cushion frame 131 in the front-rear direction of the seat, and a guide member 134 for guiding the movement of the guided part 131a.

The seat rail 132 comprises the upper rail 132a and the lower rail 132b. The upper rail 132a functions as a slider and is provided slidably on the lower rail 132b. The seat rail used in the present invention is a general-purpose linear seat rail.

Basically, a seat is fixed to the upper rail 132a so that it slides forward and backward along the lower rail 132b. The seat rails 132 are used in a pair and disposed in parallel each other. To the front end and the rear end of the lower rail 132b, vehicle-body-fixing brackets 134d and 135 are secured respectively, and the lower rail 132b is fixed to a vehicle body via the vehicle-body-fixing brackets. Since the structures inside the vehicles are different depending on the vehicle on which the seat is mounted, a special vehicle-body-fixing bracket is used for each vehicle type so that the seat rail is disposed at an appropriate position. That is to say, changing the vehicle-body-fixing bracket to suit each type of vehicle enables the general-purpose seat rail to be used in many types of vehicles. The seat rails 132 may be disposed in different levels depending on the type of vehicle.

Figure 4:
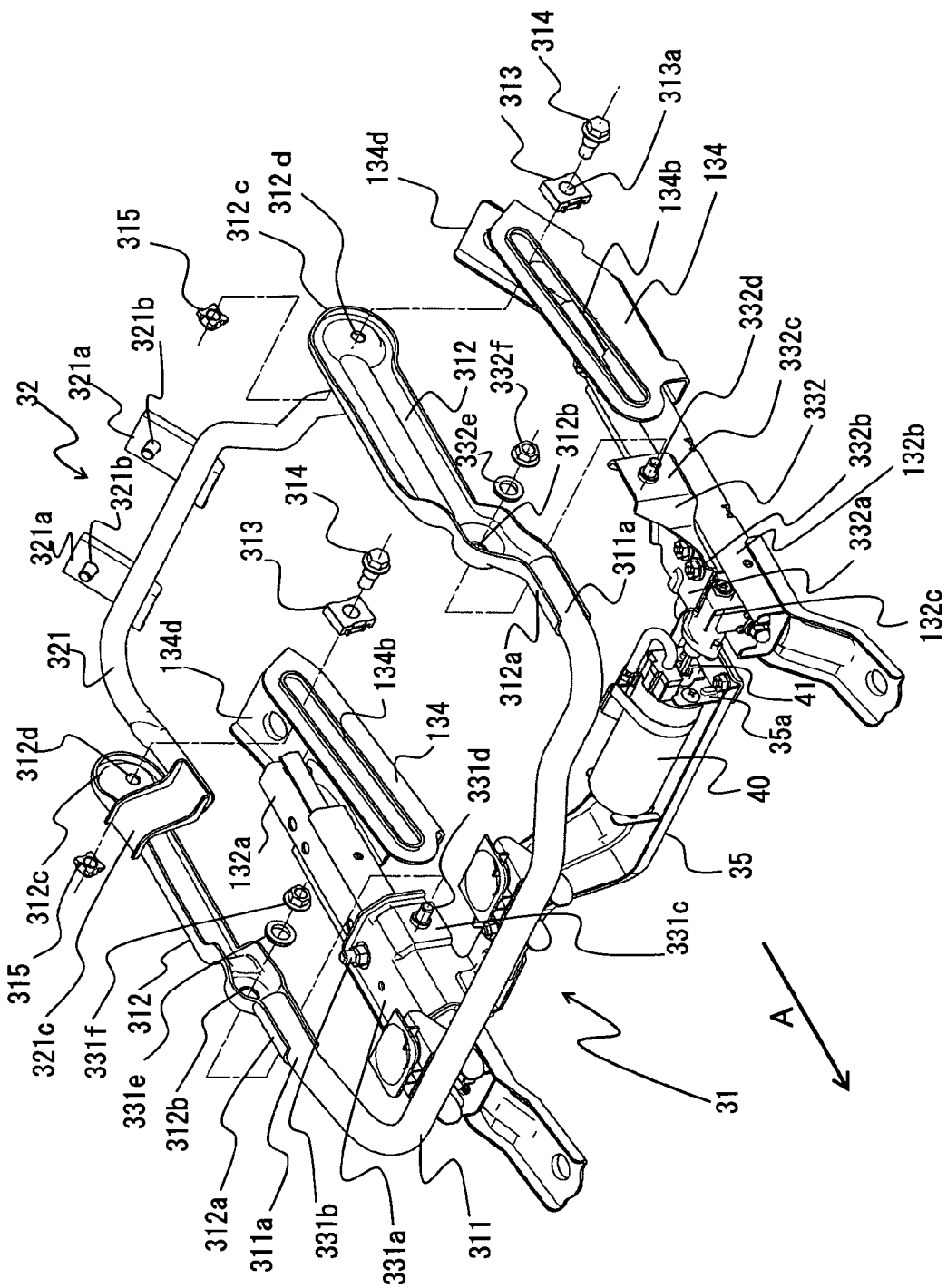
FIG. 4 is an exploded perspective view showing the structure of the seat cushion angle adjustment mechanism according to an embodiment of the present invention.

FIG. 4 is an exploded perspective view depicting the configuration of the seat cushion angle adjustment mechanism 13. Referring to this FIG. 4, the configuration of the seat cushion angle adjustment mechanism 13 will be described in detail.

As to the seat cushion frame 131, a first frame 31 having three ribs and substantially U-shaped in a planar view and a second frame 32 similarly having three ribs an substantially U-shaped in a planar view are jointed by welding to form the frame substantially rectangular-shaped.

The first frame 31 comprises a pipe 311 substantially U-shaped in a planar view and arms 312 connected to the both ends 311a of the pipe 311. The arm 312 has a first penetrating hole 312b in the vicinity of the connection end 312a with the pipe 311, and a second penetrating hole 312d at the other end of the connection end 312a, namely at the tip end 312c. The first penetrating hole 312b is provided to locate at the almost middle in the front-rear direction of the seat cushion frame 131. The first penetrating hole 312b becomes a coupling position with the pivotal coupling member of the seat cushion frame. The tip end 312c functions as a guided part 131a of the seat cushion frame 131 of which the movement trajectory is guided by a guide member which will be described later.

The second frame 32 is a pipe 321 substantially U-shaped in a planar view, and one end of the two of the pipe 321 is directly welded to the inside of the arm 312 and the other end is connected to the arm 312 via the connection bracket 321c crossing over the guide member 134 which will be described later. At the seat back side end of the second frame 32, connection brackets 321a are welded. The connection bracket 321a is fastened to the coupling plate 115 with a bolt 321b.

Next, the pivotal coupling member 133 will be explained. The pivotal coupling member 133 is a component which is disposed on the upper rail 132a and couples the seat cushion frame 131 pivotably to the seat rail. The embodiment shown in FIG. 4 corresponds to a vehicle type in which the seat rails are disposed in different levels. In case that the seat rails are disposed in different levels, the above-described vehicle-body-fixing bracket can cope with it, and in addition, changing the shapes of the pivotal coupling members 133 for the right and the left can also cope with it. That is to say, even if the seat rails are disposed in different levels, the shapes and the sizes of the vehicle-body-fixing bracket and the pivotal coupling member are appropriately selected so that the pivotal center axes of the right and left pivotal coupling members are kept horizontal.

The pivotal coupling member 133 according to the present embodiment comprises a first pivotal coupling member 331 and a second pivotal coupling member 332. Referring to FIG. 4, assuming the direction of an arrow A as the front, the pivotal coupling member at the right side of the sitting occupant is defined to be the first pivotal coupling member 331 and the one at the left side is defined to be the second pivotal coupling member 332. The right seat rail is disposed in an upper different level comparing to the left seat rail.

The first pivotal coupling member 331 is a bracket produced by bending a plate material so as to be substantially inverted L-shaped in its cross-section, and the upper end of the bracket 331a is fastened to the upper end surface of the upper rail 132a with a bolt 331b. The side end 331c elongates downward along the inner side of the seat rail 132 from the upper end 331a and a stepped bolt 331d is disposed so as to be orthogonal to the plate surface of the side end 331c.

The second pivotal coupling member 332 is a bracket produced by bending a plate material so as to be substantially L-shaped in its cross-section, and the lower end of the bracket 332a is fastened to the upper end surface of the upper rail 132a with a bolt 332b. The side end 332c elongates upwards from the lower end 332a and a stepped bolt 332d is disposed so as to be orthogonal to the plate surface of the side end 332c.

The shapes of the first pivotal coupling member 331, the second pivotal coupling member 332, and the vehicle-body-fixing bracket are made optimum so that the shaft lines of the stepped bolts 331d and 332d match each other and are horizontal. The stepped bolts 331d and 332d become couplers of the pivotal coupling members to the seat cushion frame.

The first pivot coupling member 331 and the second pivotal coupling member 332 are coupled with a coupling plate 35 for reinforcement.

The seat cushion angle adjustment mechanism 13 includes a driving motor 40 for driving the upper rails 132a on which the pivotal coupling members are fixed. The driving motor 40 is screwed via a fixing bracket 35a onto the coupling plate 35 bridged between the first pivotal coupling member 331 and the second pivotal coupling member 332. The driving motor 40 has a motor driving shaft 41, which is linked to a gear mechanism 132c provided on the upper rail 132a. A plate gear (not shown) provided on the lower rail 132b engages a gear in the gear mechanism 132c so that the upper rail 132a slides on the lower rail 132b by operation of the gear mechanism 132c in accordance with the rotation of the motor driving shaft 41. Consequently, the first pivotal coupling member 331 and the second pivotal coupling member 332 fixed to the upper rails 132a slide along the lower rails 132b, respectively.

The stepped bolt 331d of the first pivotal coupling member 331 and the stepped bolt 332d of the second pivotal coupling member 332 are fitted into the first penetrating holes 312b of the seat cushion frame 131 and fastened by nuts 331f and 332f with the washers 331e and 332e interposed, respectively. Thereby, the seat cushion frame 131 can slide along the seat rails and pivot about the coupled positions with the first pivotal coupling member 331 and the second pivotal coupling member 332.

Figure 5:
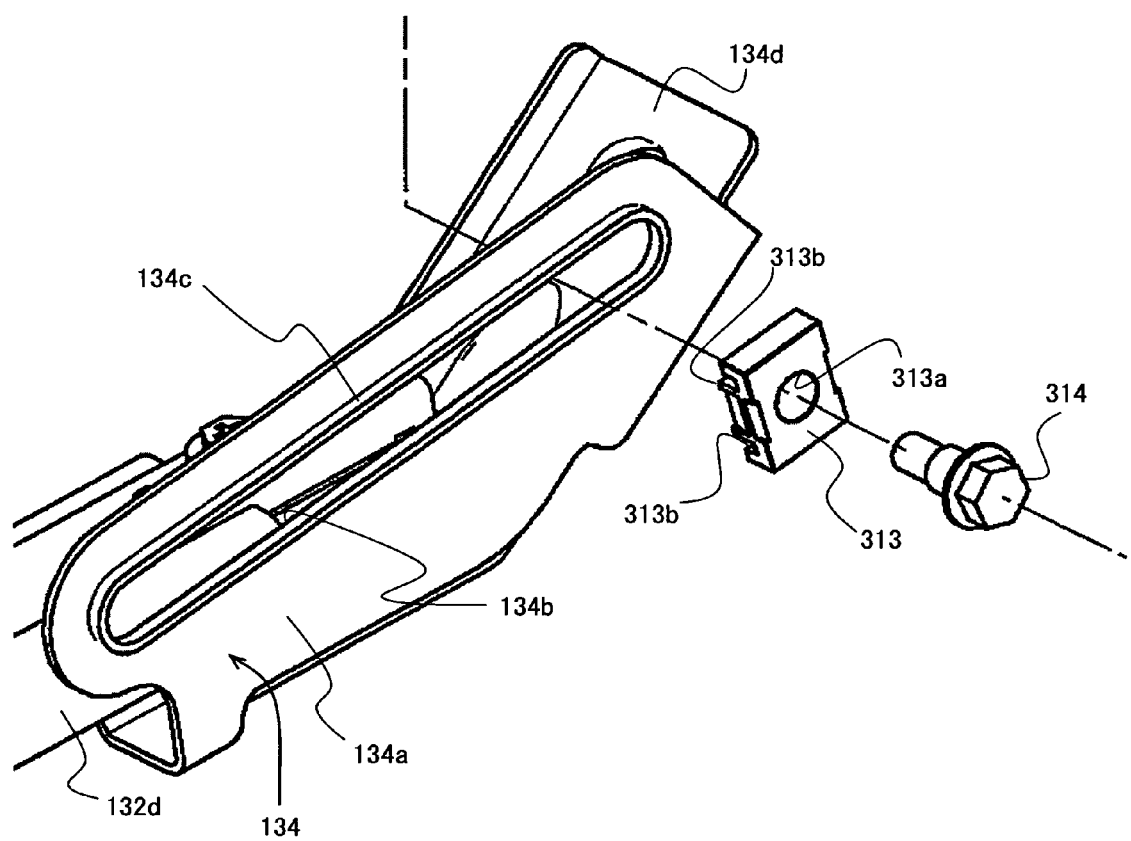
FIG. 5 is an exploded perspective view showing the structure of a guide member according to an embodiment of the present invention.

As shown in FIG. 5, the guide member 134 is a plate member comprising a vehicle-body-fixing bracket 134d at the rear part and a plate part 134a which faces the side surface 132d of the seat rail and is vertical. That is, the guide member 134 is integrated with the vehicle-body-fixing bracket. The plate part 134a has a long hole 134d penetrating therethrough to function as a guide groove. Around the periphery of the long hole 134b, a protruding part 134c is formed. A slider 313 is engaged into the long hole 134b. The slider 313 has a penetrating hole 313a through which a stepped bolt 314 is inserted at the center thereof, and slide grooves 313b to engage the protruding part 134c. Accordingly, the slider 313 moves along the long hole 134b.

As shown in FIG. 4, the slider 313 is fitted into the long hole 134b of the guide member 134, and the stepped bolt 314 is inserted into the second penetrating hole 312d of the seat cushion frame 131 and is fastened with a nut 315. Thereby, the tip end 312c of the first frame 31 functioning as a guided part pivotally moves along the long hole 134b via the slider 313 functioning as an engagement member.

Next, the principle of operation of the angle adjustment mechanism 13 according to the present embodiment will be described in detail.

Figure 6A:
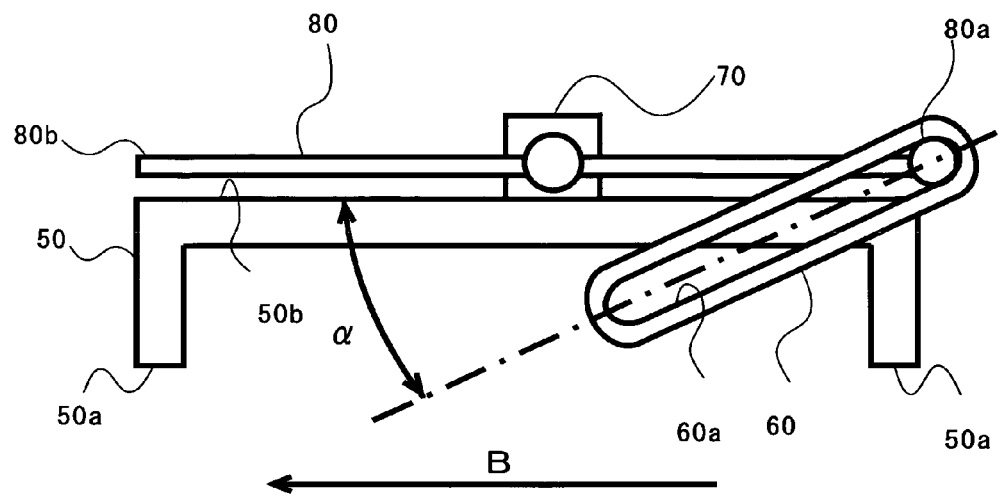
FIG. 6A is a view schematically depicting the principle of operation of the seat cushion angle adjustment mechanism in a normal mode according to an embodiment of the present embodiment.
Figure 6B:
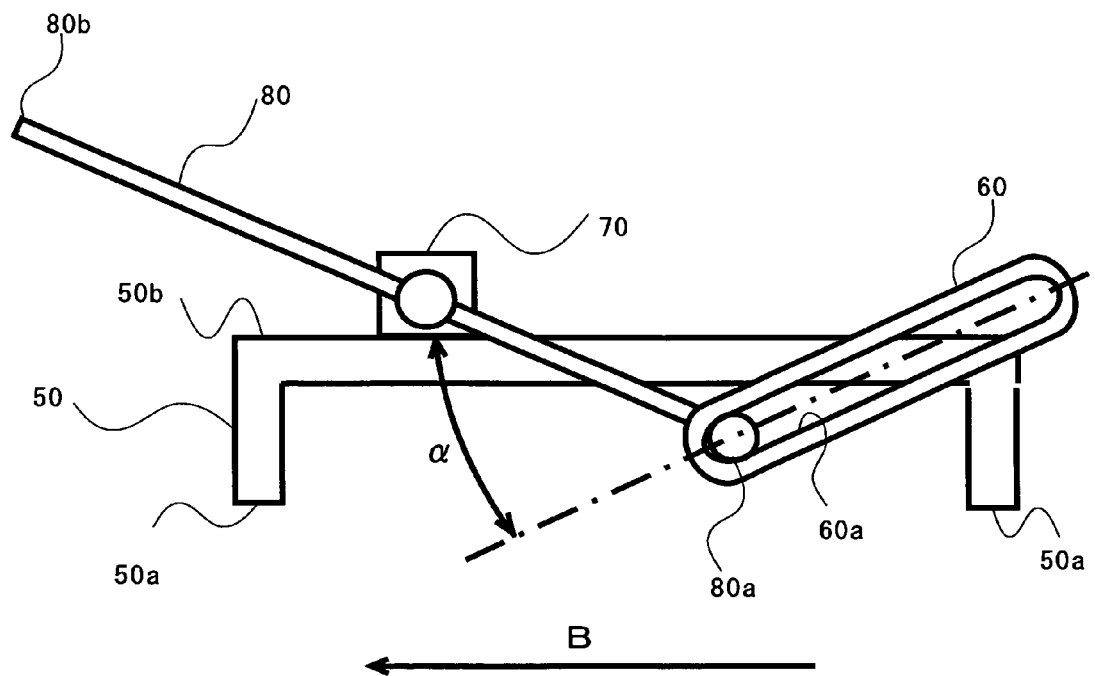
FIG. 6B is a view schematically depicting the principle of operation of the seat cushion angle adjustment mechanism in a reclining mode according to an embodiment of the present embodiment.

FIG. 6A shows a first state as a normal mode. In the first state, a so-called reclining position is not taken so that the front of the seat cushion has not been raised. On the other hand, FIG. 6B shows a second state as a reclining mode. In the second state, a so-called reclining position is taken so that the front of the seat cushion has been raised. The direction of the arrows B in the drawings is assumed to be the front.

In FIGS. 6A and 6B, a long member with legs 50a represents a seat rail 50, a member having a long hole 60a provided diagonally with respect to the seat rail 50 represents a guide member 60, a square member disposed on the seat rail 50 represents a pivotal coupling member 70, and the long bar-like member pivotally coupled to the pivotal coupling member 70 at the middle part thereof represents the seat cushion frame 80. The pivotal coupling member 70 is slidable on along a slide surface 50b of the seat rail 50, and a guided part 80a to pivotably engage the guide member 60 is formed at the rear end of the seat cushion frame 80.

The feature of the present invention is to dispose the guide member 60 so that the angle made by the guide groove (the long hole 60a) and the slide surface 50a of the seat rail 50 becomes a specific angle α. That is, the seat cushion frame 80 is pivotable about two points, namely the pivotably coupled position with the pivotal coupling member 70 and a distant position from the coupled position. The guide member 60 to guide the distant position (the guided part 80a) is disposed to have the specific angle α to the slide surface 50b so that the moving directions of the two points are different depending on the movement of the pivotal coupling member 70. This changes the seat cushion angle. In the present invention, it is sufficient that the moving directions of the two points in the seat cushion frame, namely the pivotably coupled position with the pivotal coupling member and the guided part at the distant position from the coupled position, are different. Then, either way that the front end of the seat cushion frame is raised and that the rear end of it is lowered will be acceptable. It will be acceptable if the seat cushion angle can be adjusted as a result that the moving directions of the two points are different.

As shown in FIG. 6B, as the pivotal coupling member 70 moves forward, the guided part 80a at the rear end of the seat cushion frame 80 moves downward from the slide surface 50a, namely forward and obliquely downward, guided by the guide member 60. Then, as its counteraction, the tip end 80b of the seat cushion frame 80 is raised upward from the slide surface 50a, namely forward and obliquely upward. This results in that the front end of the seat cushion frame is raised and makes an angle to the seat cushion. If the angle α between the slide surface 50a and the guide member 60 is 0 degrees, the moving trajectory of the guided part 80a will coincide with the slide surface 50a so that change in the up-down direction of the front end 80b of the seat cushion frame cannot be obtained. Therefore, the specific angle α should be set to an appropriate angle in order to obtain a desired seat cushion angle.

Figure 7:
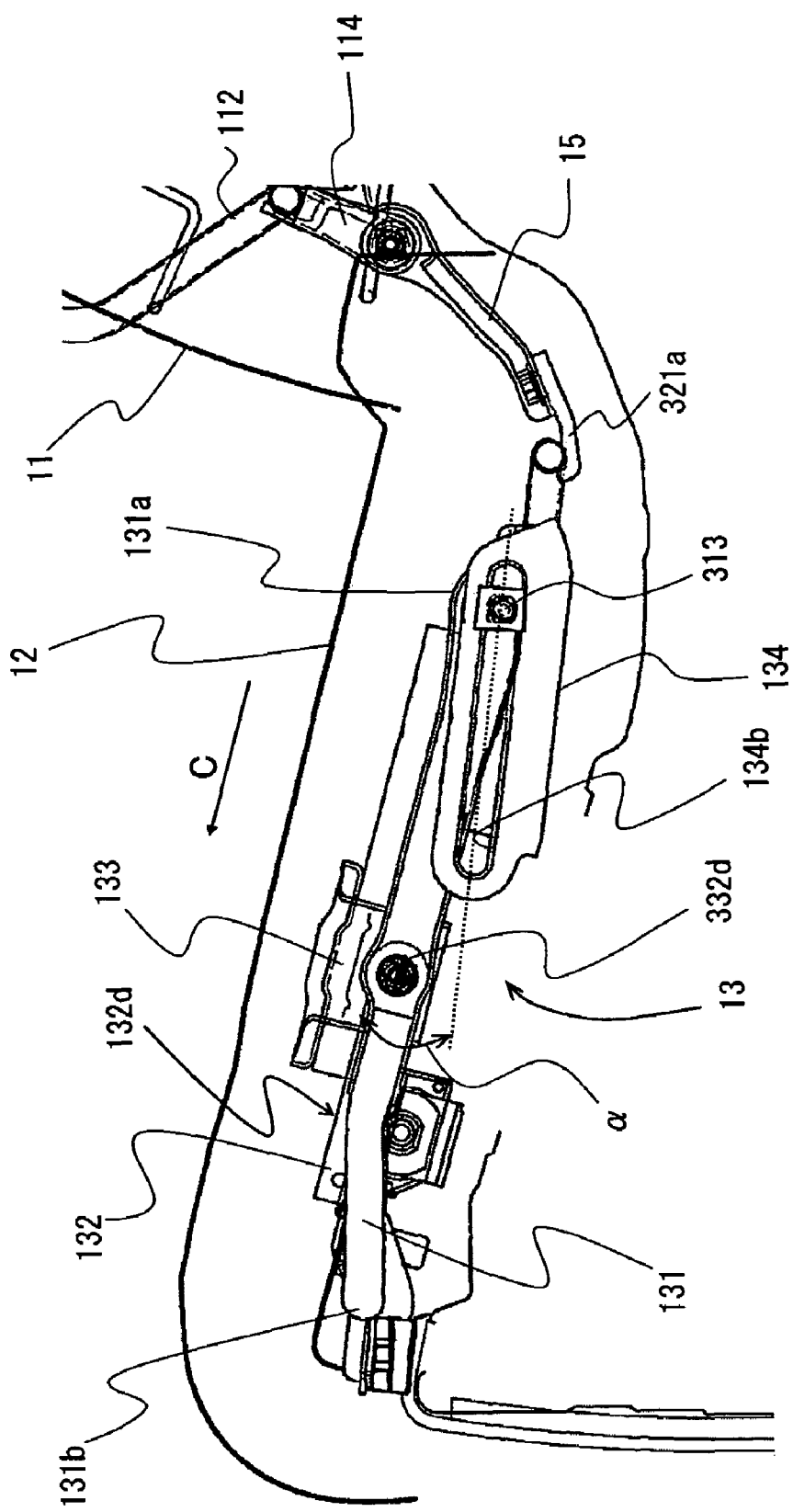
FIG. 7 is a view schematically illustrating a partial configuration of the seat cushion angle adjustment mechanism in a normal mode according to an embodiment of the present invention.

In the present embodiment, the guide member 134 is integrated with the vehicle-body-fixing bracket 134 as shown in FIG. 5, but the angle α between the long hole 134b of the guide member 134 and the slide surface of the seat rail 132 is preliminarily set to be an angle to be able to obtain a desired seat cushion angle when the guide member 134 is fixed to the vehicle body. FIG. 7 is an enlarged view of the seat cushion angle adjustment mechanism 13. As shown in FIG. 7, the guide member 134 is disposed in a position where the angle between the long hole 134b and the slide surface 132d of the seat rail 132 is the specific angle α.

Next, the entire operation of the vehicle seat assembly according to the present embodiment will be described.

Figure 2:
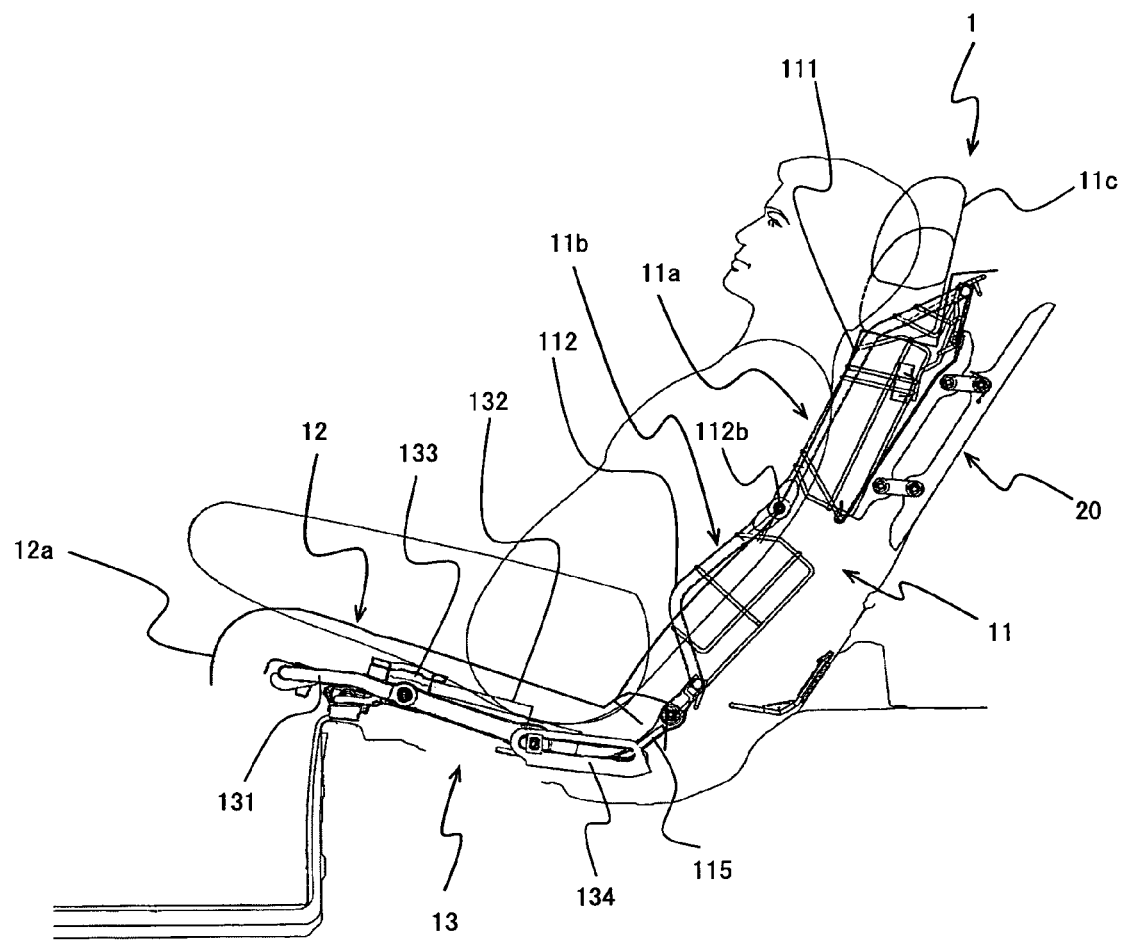
FIG. 2 is a view schematically illustrating a partial configuration of the vehicle seat assembly in a reclining mode according to an embodiment of the present invention.
Figure 8:
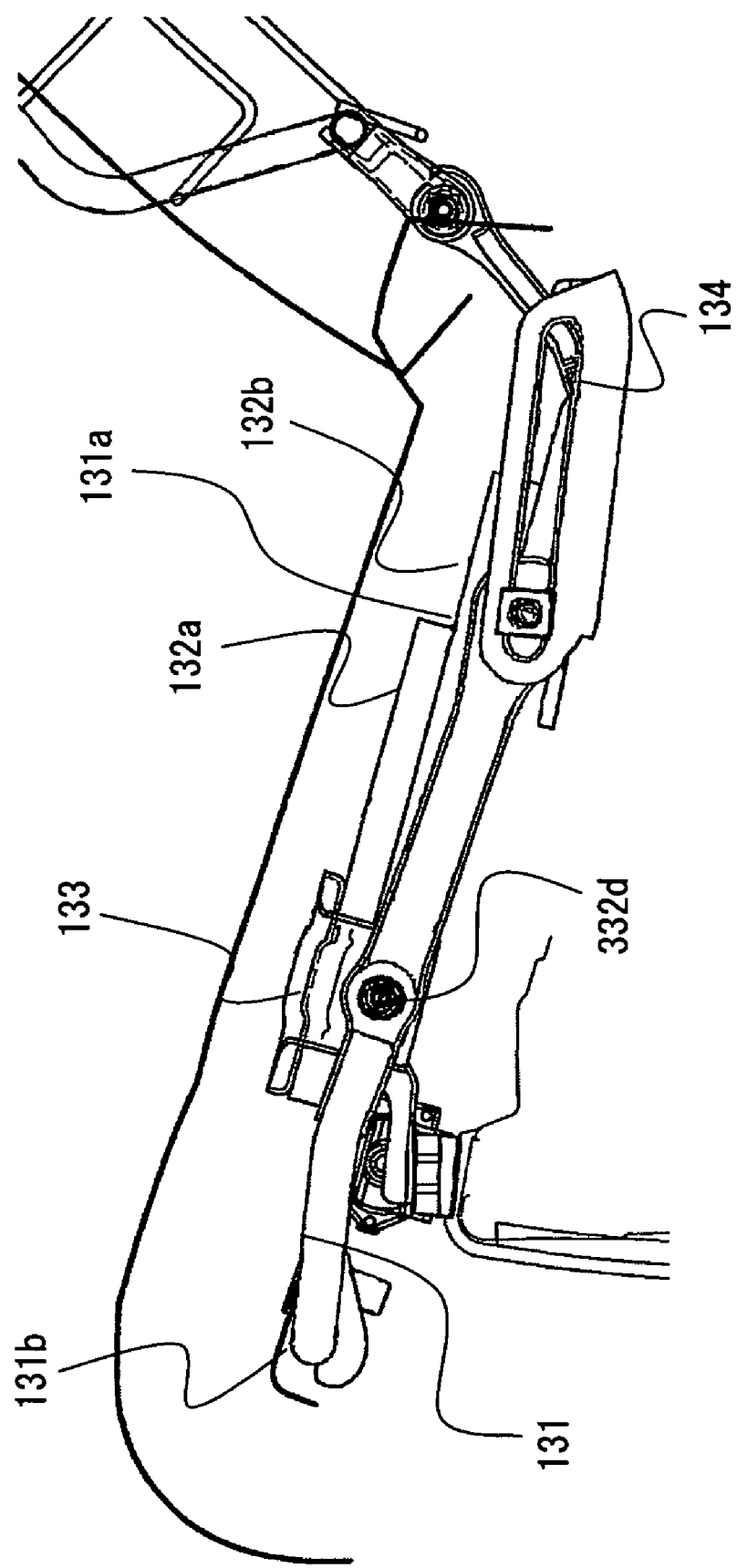
FIG. 8 is a view schematically illustrating a partial configuration of the seat cushion angle adjustment mechanism in a reclining mode according to an embodiment of the present invention.

FIG. 1 depicts a first state as a normal mode. FIG. 2 depicts a second state as a reclining mode. FIG. 7 shows the enlarged part of the seat cushion angle adjustment mechanism 13 in FIG. 1. FIG. 8 shows the enlarged part of the seat cushion angle adjustment mechanism 13 in FIG. 2.

In the first state as the normal mode, the seat back 11 does not form a reclining angle and is in a state that a so-called reclining position is not taken. Starting up the driving motor 40 from this state and moving the upper rail toward the direction of the arrow C in FIG. 7, the seat cushion frame 131 coupled to the pivotal coupling member 133 moves toward the direction of the arrow C, too. At the same time, the guided part 131a of the seat cushion frame 131 moves along the long hole 134b via the slider 313 engaged with the guide member 134. The seat cushion frame 131 pivots about the stepped bolt 332d of the pivotal coupling member 133 so that the front end 131b of the seat cushion frame 131 opposite to the guided part 131a moves diagonally upward with respect to the stepped bolt 332d as a supporting point with the movement of the guided part 131a.

Since, as shown in FIGS. 1 and 2, the rear end of the seat cushion frame 131 is coupled to the lower frame 112 of the lower seat back 11b via the coupling plate 115, the lower seat back 11b is drawn by the seat cushion frame 131 as the seat cushion frame 131 moves. Besides, since the upper end of the lower frame of the seat back 11b is bendably coupled to the upper frame 111 of the upper seat back 11a, the lower seat back 11b bends at the coupled part with the upper seat back 11a and moves forward as drawn by the seat cushion frame 131. This will provide the reclining angle.

Since the upper seat back 11a is coupled to the lower seat back 11b, it is drawn with the movement of the lower seat back 11b. Besides, since the upper seat back 11a is fixed to the parallel link mechanism 20, the upper seat back 11 moves downward in parallel.

As described above, according to the present embodiment, the seat cushion 12 slides forward and the front end 12a of the seat cushion 12 is raised so that a comfortable seat cushion angle can be provided to prevent the hip-sliding. In addition, the lower seat back 11b moves forward to achieve a comfortable reclining angle, supporting the occupant's lower back. Moreover, the occupant's upper body can be supported with small changes in position to lean forward or backward since the upper seat back moves downward in parallel.

According to the present embodiment, the guide member 134 is integrated with the vehicle-body-fixing bracket. This will reduce man-hours to improve the efficiency in assembling as well as to improve the accuracy in assembling.

Figure 9A:
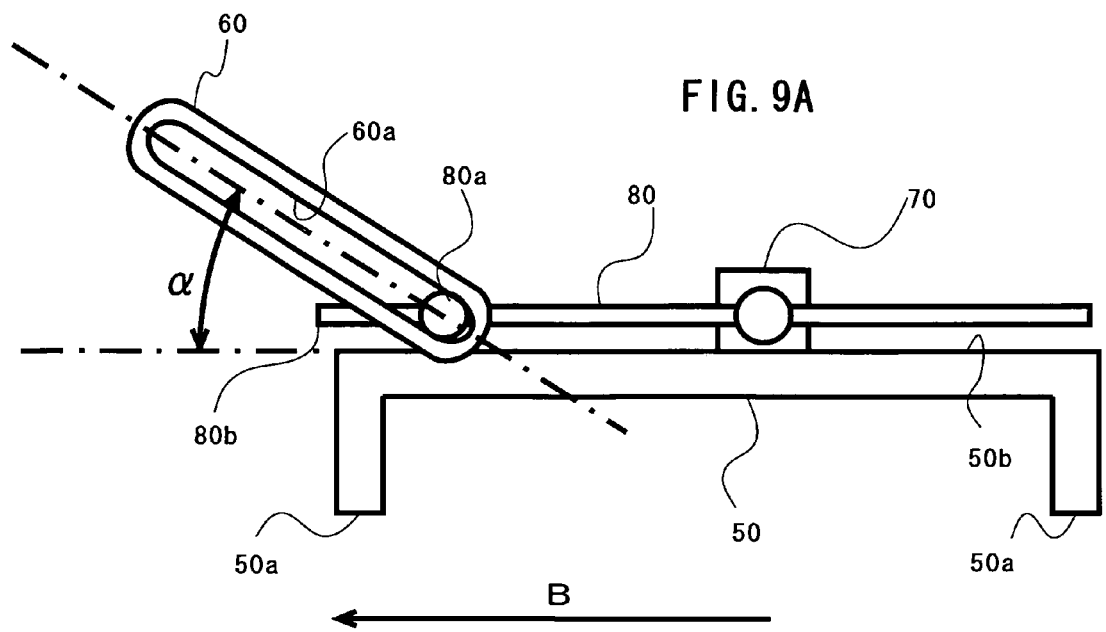
FIG. 9A is a view schematically depicting the principle of operation of the seat cushion angle adjustment mechanism in a normal mode according to the present invention.
Figure 9B:
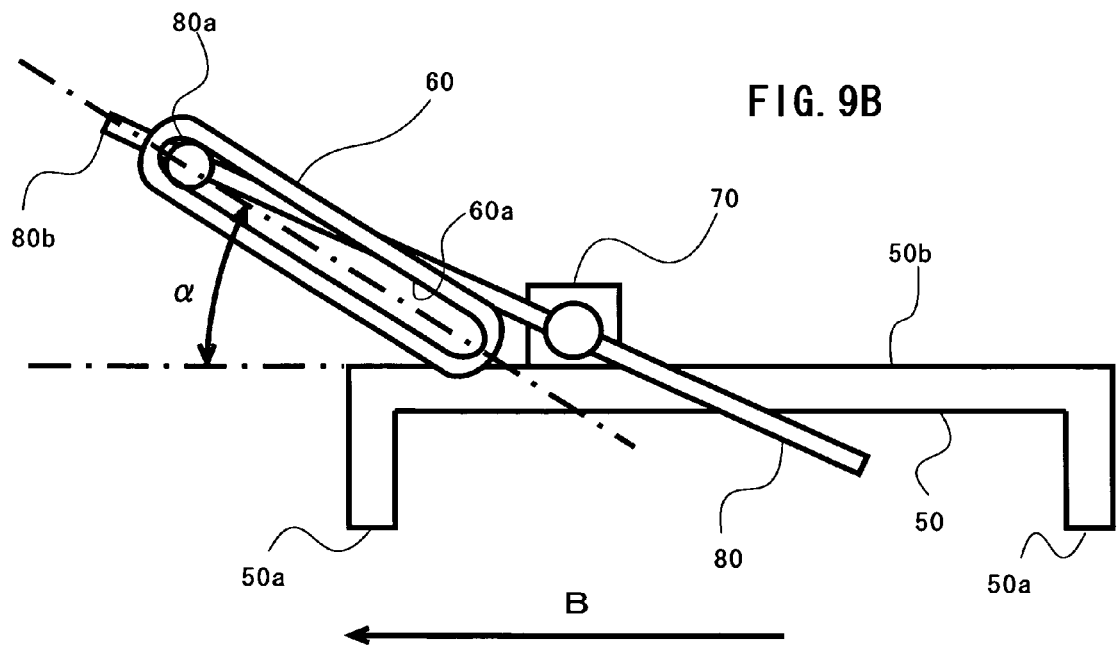
FIG. 9B is a view schematically depicting the principle of operation of the seat cushion angle adjustment mechanism in a reclining mode according to the present invention.

As set forth above, the present invention is described by way of the preferred embodiment but is not limited to the above embodiment. A person skilled in the art can easily modify, add, and convert the each element in the above embodiment within the scope of the present invention. For example, in the above preferred embodiment, the guide member 134 is disposed at the rear part of the seat rail, but as shown in FIGS. 9A and 9B, the guide member 60 may be disposed at the front part of the seat rail. In this case, the guided part 80a should be provided at a position forward away from the position coupled to the pivotal coupling member 70 of the seat cushion frame 80 with a specific distance. Then, the guide member 60 is disposed at the position to form the specific angle α with the slide surface 50b of the seat rail 50 so that the guide member 60 guides the guided part 80a and the tip end 80b of the seat cushion frame 80 is raised forward and obliquely upward. If the guide member 60 is disposed at the front part of the seat rail like this, the guide member 60 is preferably formed integrally with the vehicle-body-fixing bracket at the front part.

In the present invention, it is not necessary that the guide member and the vehicle-body-fixing bracket must be formed integrally but they may be separate components if the guide groove of the guide member and the slide surface of the seat rail are disposed to make a specific angle α.

In the present embodiment, a plate member having a long hole is used as the guide member, but the shape of the guide member is not limited to this but is sufficient that it has a guide groove to guide the guided part. In this case, the guided part should have an engagement member which is engaged with the guide groove and moves along the guide groove. This achieves reliable seat cushion angle adjustment in a simple configuration.

In the present embodiment, the upper seat back is slidable in the up-down direction by means of the parallel link mechanism, but the mechanism to make the upper seat back slide in the up-down direction is not limited to the parallel link mechanism but may employ components having a guide groove or a long hole.

In the present embodiment, the stepped bolt 331d of the first pivotal coupling member 331 and the stepped bolt 332d of the second pivotal coupling member 332, which are the couplers of the pivotal coupling member to the seat cushion frame, are disposed to point to the same direction as shown in FIG. 4. That is, both of them are disposed to point to either the right or left direction of the seat on the right and left seat rails. The both guide members 134 are also disposed on the same side in the right-left direction of the seat on the right and left seat rails. This is to improve work efficiency because the seat cushion angle adjustment mechanism can be assembled from one side. However, the present invention is not limited to this configuration but the stepped bolts 331d and 332d may point toward inside each other or may point toward outside each other. Further, the guide member may be disposed either on the right side or the left side of the seat rail. The shapes and arrangements of the other components should be preferable ones as appropriate.

As set forth above, the present invention is described by way of the preferred embodiment but is not limited to the above embodiment. A person skilled in the art can easily modify, add, and convert the each element in the above embodiment within the scope of the present invention. For example, the seat cushion angle adjustment mechanism according to the present invention is preferable to be applied to a seat assembly employing a bendable and broken-type seat back, but may be applied to another type of seat assembly.

What is claimed is:

1. A vehicle seat assembly comprising:
a seat back;
a seat cushion coupled to the seat back; and
a seat cushion angle adjustment mechanism for adjusting a seat cushion angle of the seat cushion; wherein
the seat cushion angle adjustment mechanism comprising:
a seat cushion frame;
a pivotal coupling member configured to pivotably couple the seat cushion frame to a slider of a seat rail;
a guided member coupled to the seat cushion frame, the guided member configured to be guided at a different position than the pivotal coupling member; and
a guide member configured to guide movement of the guided member in a specific angular direction and the slider configured to move in a sliding direction where the specific angular direction and the sliding direction are different so as to change a seat cushion angle with sliding of the seat cushion, wherein
the slider slides substantially linearly on the seat rail, and
the guide member guides the guided member to move linearly in the specific angular direction.

2. A vehicle seat assembly according to claim 1, wherein the guide member engages the guided member and has a long hole for guiding movement of the guided member.

3. The vehicle seat assembly according to claim 1, wherein the guide member is formed integrally with a bracket to fix the seat rail to a vehicle body.

4. The vehicle seat assembly according to claim 1, wherein the seat back comprises an upper frame and a lower frame bendably coupled to the upper frame,
the upper frame has a side mechanism for sliding in the up-down direction of the seat, and
the lower frame is pivotably coupled to a seat back side end of the seat cushion frame.

5. The vehicle seat assembly according to claim 1, wherein the pivotal coupling member includes a first pivotal coupling member and a second pivotal coupling member,
the first pivotal coupling member and the second pivotal coupling member are both disposed to point to either one of the right and left directions of the seat on right and left seat rails, and
a pair of the guide members are disposed on the same side as said either one of the right and left directions of the seat on the right and left seat rails.

6. The vehicle seat assembly according to claim 1, wherein the pivotal coupling member is coupled to a middle part of the seat cushion frame.

* * * * *